No. 751,441. PATENTED FEB. 9, 1904.
L. ANDREWS.
MEANS FOR PROTECTION AGAINST REVERSE CURRENTS.
APPLICATION FILED JUNE 25, 1903.
NO MODEL.

WITNESSES.

INVENTOR.
Leonard Andrews.
BY
ATTORNEY.

No. 751,441. Patented February 9, 1904.

UNITED STATES PATENT OFFICE.

LEONARD ANDREWS, OF MANCHESTER, ENGLAND, ASSIGNOR TO STANLEY ELECTRIC MANUFACTURING COMPANY, OF PITTSFIELD, MASSACHUSETTS, A CORPORATION OF NEW JERSEY.

MEANS FOR PROTECTION AGAINST REVERSE CURRENTS.

SPECIFICATION forming part of Letters Patent No. 751,441, dated February 9, 1904.

Application filed June 25, 1903. Serial No. 163,010. (No model.)

*To all whom it may concern:*

Be it known that I, LEONARD ANDREWS, a subject of the King of England, and a resident of Manchester, England, have invented certain new and useful Improvements in Means for Protection Against Reverse Currents, of which the following is a specification.

My invention relates to alternating-current systems of distribution, and is especially applicable to those systems in which alternating-current generators operate in parallel. In such systems it is important that if one of the generators should fail while connected to the bus-bars it should be at once cut out.

The object of my invention is to provide protective means in case of such reversal and to furnish a simple and efficient means for such protection without complication of circuits and without the addition of moving parts.

My invention may be used either to give warning of such reversal by means of indicating devices or to automatically cut out the failing generator.

Although I shall describe my invention as applied to the protection of alternating-current generators in parallel, it is obvious that it is not limited to such systems, as it may be used to advantage in many alternating-current systems where devices are connected in parallel.

Figure 1:
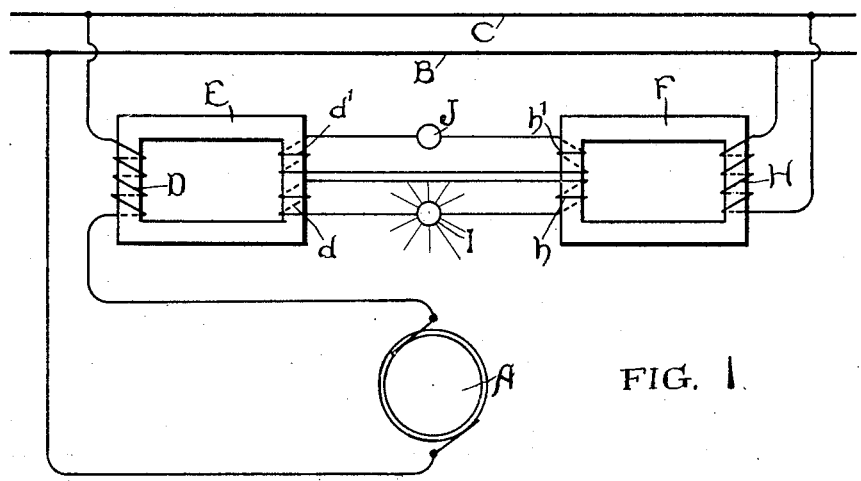
Figure 2:
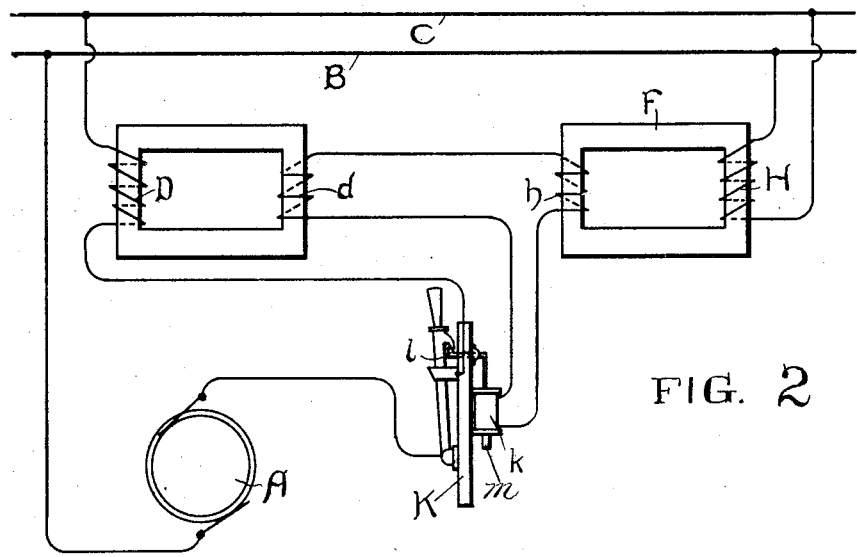

Referring to the drawings, Figure 1 shows a diagrammatic representation of my invention used with indicating or alarm devices. Fig. 2 shows my invention used in connection with the tripping-coil of an automatic circuit-breaker.

In the drawings, A represents an alternating-current generator connected to the bus-bars B C. One generator lead is directly connected to the bus-bars, while in the other is inserted the primary winding D of the transformer E. Transformer E also carries on its core two secondary windings $d$ $d'$. Transformer F carries on its core the primary winding H, which is connected in shunt to the bus-bars B C, and also the secondary winding $h$ $h'$.

I and J are two lamps or other indicating devices which are connected in series with both secondary windings $d$ and $h$ and $d'$ and $h'$, respectively. The lamp I is so connected to the secondaries $d$ $h$ that it receives the voltage of the two in series when generator A is in a normal condition and is supplying current to the bus-bars B C. Lamp J is so connected to secondaries $d'$ $h'$ that the voltage from the two secondaries is in opposition at the lamp, and the lamp receives little or no current when generator A is supplying current to the bus-bars. If now generator A fails for any cause and current flows through the bus-bars to the generator it is obvious that the flux produced by coil D will be reversed in phase relative to that produced by coil H. Consequently the voltage of the secondaries $d$ $h$ will oppose each other in the circuit of lamp I and will be in series in the circuit of lamp J. Lamp I will accordingly be put out and lamp J will be illuminated. Thus warning of the failure of the generator A is given to the attendant, who can at once cut it out from the bus-bars. Lamps I and J are preferably of different colors, such as green and red, in order to avoid a possible confusion and make the warning more conspicuous. It is obvious that either of these lamps may be omitted, the warning being given by the failure of the illumination of a single lamp.

In Fig. 2 only one secondary is employed on each transformer. The two are connected in series through tripping-coil $k$ of automatic circuit-breaker K. Tripping-coil $k$ is so connected to the secondaries $d$ $h$ that the voltages of the two secondaries are in opposition in the circuit of the tripping-coil $k$ when generator A is in the normal condition, supplying current to the bus-bars B C. The tripping-coil $k$ thus corresponds to lamp J in Fig. 1. Thus if generator A fails and a reversal of current follows the fluxes in transformers E and F will be reversed in phase relation, and the voltages of the secondaries $d$ and $h$ will be in series in the circuit of tripping-coil $k$. Coil $k$ will thus draw up its armature $m$ and release the latch $l$, thereby opening the circuit-breaker. Generator A is thus automatically cut out from the bus-bars. It is evident that my invention can thus be used either to give warning by signaling devices or to automatically cut out the failing generator, or both methods may be used in combination.

It is evident that without adding any moving parts to the circuits I am thus enabled to furnish complete protection against current reversal and the damage liable to occur therefrom.

I do not desire to limit myself to the particular construction and arrangement of parts here shown, since changes therein which do not depart from the spirit of my invention and which are within the scope of the appended claims will be obvious to those skilled in the art.

Having thus fully described my invention, I claim as new and desire to protect by Letters Patent—

1. In combination, an electric circuit, a winding in series with said circuit, a winding in shunt to said circuit, two magnetic circuits adapted to be energized by said windings respectively, two secondary windings adapted to be excited by said magnetic circuits respectively and an electroresponsive device connected in series with both of said secondaries.

2. In combination, a main circuit, a local circuit, an electroresponsive device in said local circuit, and means for producing in said local circuit two electromotive forces, one of said electromotive forces dependent in phase on the current in the main circuit and the other dependent in phase on the voltage in the main circuit.

3. In combination, an electric circuit, a transformer having its primary in series with said circuit, a transformer having its primary in shunt to said circuit, and an electroresponsive device in series with the secondaries of both of said transformers.

4. In combination, two transformers, a main circuit, a local circuit comprising the secondaries of said two transformers and an electroresponsive device in series, and means for producing in the cores of said two transformers fluxes varying with the current and with the voltage in the main circuit respectively.

5. In combination, an alternating-current generator, station bus-bars, leads from said generator to said bus-bars, a transformer having its primary connected in one of said leads, a transformer having its primary in shunt to said bus-bars, and an electroresponsive device in series with the secondaries of both of said transformers.

6. In combination, an alternating-current generator, station bus-bars, leads from said generator to said bus-bars, an electroresponsive device and means for impressing on said device in series two electromotive forces dependent in phase on the current in said leads and on the voltage on said bus-bars respectively.

7. In combination, an alternating-current circuit, an alternating-current generator, leads from said generator to said circuit, a winding connected in one of said leads, a winding connected to said circuit, an electroresponsive device, and means for impressing upon said device in series two electromotive forces dependent in phase on the currents in said windings respectively.

Signed at Pittsfield, Massachusetts, this 16th day of June, 1903.

LEONARD ANDREWS.

Witnesses:
L. A. HAWKINS,
R. E. HAYNES.